United States Patent [19]

Blokkum et al.

[11] Patent Number: 4,908,789

[45] Date of Patent: Mar. 13, 1990

[54] METHOD AND SYSTEM FOR AUTOMATICALLY ASSIGNING MEMORY MODULES OF DIFFERENT PREDETERMINED CAPACITIES TO CONTIGUOUS SEGMENTS OF A LINEAR ADDRESS RANGE

[75] Inventors: Dag R. Blokkum; Charles R. Johns, both of Austin; Lee J. Morozink, Round Rock; David L. Peterson, Austin, all of Tex.

[73] Assignee: International Business Machines Corporation, Armonk, N.Y.

[21] Appl. No.: 34,236

[22] Filed: Apr. 1, 1987

[51] Int. Cl.[4] .................. G06F 12/00; G06F 12/02; G06F 12/06

[52] U.S. Cl. .................. 364/900; 364/926.92; 364/964

[58] Field of Search .................. 364/200, 900

[56] References Cited

U.S. PATENT DOCUMENTS

| Re. 31,318 | 7/1983 | Kaufman et al. | 364/200 |
|---|---|---|---|
| 3,803,560 | 4/1974 | DeVoy et al. | 340/172.5 |
| 3,813,652 | 5/1974 | Elmer et al. | 340/172.5 |
| 3,916,384 | 10/1975 | Fleming et al. | 364/200 |
| 4,121,286 | 10/1978 | Venton et al. | 364/200 |
| 4,162,519 | 7/1979 | Hanewinkel | 364/200 |
| 4,342,079 | 7/1982 | Stewart et al. | 364/200 |
| 4,511,964 | 4/1985 | Georg et al. | 364/200 |
| 4,713,759 | 12/1987 | Yamagishi et al. | 364/200 |

OTHER PUBLICATIONS

IBM TDB vol. 11, No. 1, Jun. 1968, pp. 67-70, Palounek, Memory Allocation and Addressing.

IBM TDB Vol. 15, No. 3, Aug. 1972, pp. 1035-1036, Koch, Memory Addressing System.

Primary Examiner—Gareth D. Shaw
Assistant Examiner—Joseph T. Fitzgerald
Attorney, Agent, or Firm—Richard E. Cummins

[57] ABSTRACT

A method and system for addressing memory of an information handling system in which the memory comprises a plurality of memory banks, each of which can support a plurality of different predetermined size memory modules. The sizes of the different modules are multiples of the module having the smallest size. In the embodiment described, two different sizes are employed, a 256K capacity module and a 1 Meg. capacity module, either of which can be installed in 1 of 4 memory banks. The maximum addressable address range is therefore 4 Meg. while the minimum memory is 256K. The address range can be increased in increments of 256K corresponding to 1 segment to a total of 16 contiguous segments or 4 Meg. A memory address bus comprising 22 lines is employed in the system. The 20 low order lines address each bank simultaneously. A converter converts the 4 high order address bits 22-19 to 16 sequentially ordered segment lines. A matrix of similar logic cells consisting of combinatorial logic processes each segment line to develop memory bank select signals in accordance with size signals obtained from the modules and supplied to the cells in the first row of the matrix which then provide modified size signals to remaining cells in the respective columns of the matrix. Contiguous address segments are provided from the minimum to the maximum range for every possible combination of memory modules installable in the four banks.

11 Claims, 9 Drawing Sheets

METHOD AND SYSTEM FOR AUTOMATICALLY ASSIGNING MEMORY MODULES OF DIFFERENT PREDETERMINED CAPACITIES TO CONTIGUOUS SEGMENTS OF A LINEAR ADDRESS RANGE

FIELD OF INVENTION

This invention relates in general to memory systems for information handling systems which employ replaceable memory modules and, in particular, to a method and system for automatically assigning a plurality of memory modules which can have different predetermined address capacities to contiguous segments of a linear address range of the information handling system.

BACKGROUND ART

The prior art discloses various memory arrangements for storing data in an information handling system. In general, these memory arrangements include a memory controller function and a plurality of memory modules which are manufactured in the form of semiconductor chips having a predetermined number of memory cells. The chips are often referred to as RAM memory, Random Access Memory, in that each storage location is directly addressable as distinguished from other type of memory devices such as magnetic tape where a number of storage locations must be scanned before reaching the desired addressed location.

The number of addressable storage locations on a RAM chip is determined by the physical size of the chip and the size of each individual memory cell with some consideration for the area needed for various signal paths. The physical size of chips has been constrained more by de facto industry standards than by technology. Increases in storage capacity, however, have occurred quite rapidly over the years, primarily due to improved semiconductor material and manufacturing process techniques.

RAM memory chips or modules are currently being produced and marketed in three popular capacities, 64K, 256K, and 1 Meg.

Many older personal computers still in use employ RAM memory chips of 16K and 32K capacities while 2 Meg and 4 Meg capacities are available in limited supply for prototype development.

A 64K memory chip, for example, has 2 to the 16 power (2*16) addressable storage locations. Each storage location contains one memory cell and can store one binary bit. In most data processing systems, data is handled in "bytes" each of which consist of eight data bits and one parity bit. Data is transferred throughout the system serial by byte on a data bus consisting of eight data lines and one parity line.

In such a system, a memory bank would include nine chips or modules which store 64K bytes at 64K addressable storage locations. Any type of binary data may be stored in RAM memory, i.e., it may be an operating system program, an application program or user data.

The transfer of data to and from the memory involves first addressing a specific location and second, writing a byte of data or reading a byte of data from the addressed location at a particular clock time of the memory cycle. Therefore, in addition to address lines, a number of control lines are associated with each cell.

The address range of the computing system and, in turn, its maximum memory capacity is determined primarily by the the number of address lines that are provided in the system architecture. An address range of 0–64K requires 2*16 permutations of 16 binary bits. A 16 bit address is therefore needed and a 16 bit address bus must be provided if a 64K system memory is desired.

Increasing the address bus by one line effectively doubles the previous range or capacity of the system. As shown in the following table, for every address line added to the address bus, the available addressable location doubles.

| Address Lines | Addressable Locations (nominal) |
| --- | --- |
| 16 | 64K |
| 17 | 128K |
| 18 | 256K |
| 19 | 512K |
| 20 | 1 Meg |
| 21 | 2 Meg |
| 22 | 4 Meg |
| 23 | 8 Meg |
| 24 | 16 meg |

It should be noted that memory capacity is not the same as address range. Memory capacity is generally expressed as byte capacity such as a 1 megabyte memory. Since some memory banks store two bytes or four bytes at an addressable location, the address range and memory capacity are only the same if the memory stores one byte of data.

Since a reasonable amount of increase in memory chip capacity is always anticipated by the system designer, many new systems are provided with more address lines than are necessary to support the current need. Also, since at any one time, three or four different capacity memory chips are available, the designer needs to provide some way to increase memory capacity above what might be marketed as a minimum system capacity.

Since the chips are replaceable easily, the user may purchase a system with minimal memory and add additional memory at a later time. If the system is designed so that only one type of memory chip may be added to the remaining empty memory banks, the problem of advising the system of the available memory installed is straightforward, provided the added memory is inserted in the correct memory banks. If not, a "hole" would exist in the address range which the operating system of the microprocessor cannot tolerate.

If the system is designed to accommodate memory chips of varying different capacities such as 64K, 256K and 1 Meg, then the problem of identifying what capacity modules are in each bank becomes somewhat more complicated. For example, assume the system is designed with a memory address range of 0 to 4 megabytes or 2*22 addressable storage locations that encompass four separate memory banks. The minimum memory capacity would be 64K bytes obtained by one bank of nine 64K modules. As the three empty banks are filled with modules, the system must be capable of identifying what capacity modules have been installed in what bank in order to select the correct memory bank and to gate the correct number of address lines to that bank, since a 64K module needs 16 lines, a 256K module needs 18 lines, and a 1 Meg module need 20 address lines.

In addition to selecting the correct number of lines, the position of the memory banks in the overall range must be contiguous. Thus, if all four banks had 64K modules and the first bank of 64K modules were replaced with 256K modules, the previous addressing line assignments to the other three banks would have to be altered.

The prior art has disclosed a number of memory system organizations which employ replaceable memory modules. These systems were faced with the problem of assigning memory banks to form a linear address range without any holes. In these systems, the memory address range was predetermined since the number of memory banks was set and only one memory module of one capacity was available.

Systems were subsequently developed that could detect a faulty module or memory bank and either reconfigure the remaining good modules to avoid any gaps in the address range or insert a spare module in place of the faulty module. These systems employed both manual and automatic arrangements in which the address range was divided into equal segments, each having a range corresponding to the number of address storage locations in each module or bank.

Since the address capacity of all range segments and modules were the same and pre-established, the reconfiguration process was relatively straightforward and simple to implement, either on a manual basis or an automatic basis. The U.S. Pat. No. 3,803,560 is a typical example of a memory system employing an automatic reconfiguration process for memory modules of the same capacity when one of those modules failed.

A memory system which employs modules of different sizes is disclosed in U.S. Pat. No. 3,813,652. The address transformation system translates an input address into a set of memory module select signals and a set of address signals. The individual modules which may have different capacities supply size type signals to hardware type adders which produce sets of composite size signals. These composite size signals are processed mathematically by hardware comparators supplied with the high order address signals in true and complimented form and by subtracters to develop a transformed address. The system requires serial processing of signals which increases processing time as the number of modules is increased in addition to requiring a relatively large number of complex circuit structures.

Systems have been developed which permit replacement of the original modules with different capacity modules, but these systems require the user to reset several switches, which basically sets the address range assigned to each memory bank. This provides greater flexibility in the use of memory modules, but is subject to error. Some systems employ a program to effectively set switches which may be more convenient, but is also subject to introduction of the wrong information and, as module sizes change, requires reprogramming.

U.S. re-issue Pat. No. 31,318 does disclose a memory system which can accommodate memory modules of different sizes and can automatically adjust the assignment of these modules to provide a linear address range when a module is replaced with a module of a different capacity. In that system each module has a signal source which indicates the capacity of the module. A hardware adder is also associated with each memory module. One input to the adder is from the capacity of the memory module. The other input to the adder is from the output of the adder of the previous memory module. The output of the adder of the instant module is feed to one input of the adder of the succeeding memory module.

The output of each adder represents the cumulative capacity of all modules up to that point in the sequence. Each module has a range detector which sets the address range for the module from the input of the previous module and the output of the adder. The range detector employs two hardware comparators. One comparator determines if the input address is above the beginning address of the module and the second comparator determines if the input address is below the ending address of the module. If the comparators are true, the module is selected.

While the above system operates satisfactorily, the nature of the mathematical operations, and the comparison of the input address by the range detectors requires a relatively long memory cycle in order for signals to propagate through the comparator logic and indicate a selection of the correct memory bank. In addition, the adder circuits require additional pins on the memory modules and the high order bit processing becomes quite complex.

The present invention provides a memory system which employs a plurality of different capacity modules which are assigned to the correct segment of the system address range automatically, and if a memory module is taken out of the system and not replaced or replaced with a module of different capacity, the memory modules are automatically re-assigned to maintain a contiguous address space for the system.

SUMMARY OF THE INVENTION

In accordance with the present invention, the capacity of the various memory modules employed in the system must be integral multiples of the the module having the lowest capacity. If, for example, the lowest capacity n of a module is a nominal 64K address storage location, the other modules could have capacities of 2n(128K), 3n(172K), 4n(256K) etc.

In the preferred embodiment, the memory system includes four memory banks where each memory bank has an array of memory modules, e.g., nine modules that are of the same capacity, e.g., 256K. Each bank accepts either a 256K module or a 1 Meg module so that the minimum memory configuration for the system is 256K, while the maximum memory configuration is 4 Megs. The address bus includes 22 lines, 20 of which address each memory bank simultaneously. The high order address lines H, 22-19 are used to select the correct bank. A H-to-2*h (4–16) decoder or converter is provided in which 2*H is equal to the number of segments in the maximum address range, where each segment has a size corresponding to a minimum capacity module. Under the previous assumption of four memory banks and module capacities of 256K and 1 Meg, a 4–16 decoder is provided. The number 4 is determined by the number of high order address bits required to select the 16 segments into which the maximum address range is divided.

The input to the segment decoder is the four higher order address bits which are converted to 16 segment lines that are supplied to the segment selector logic arrangement.

The function of the selector logic is to assign the sequential segment lines 1-16 to the respective banks in accordance with signals received from each installed module indicating the capacity of the array of memory modules in that bank. If, for example, memory banks 1 and 2 each have memory modules of 256K capacity and banks 3 and 4 have memory modules of 1 Meg capacity, the 2.5 Meg system address range is assigned as follows.

| Bank 1 | Address Range | Segment Lines | Identification |
|---|---|---|---|
| 1 | 0–256K | 1 | 1 |
| 2 | 256K–512K | 1 | 2 |
| 3 | 512K–1.512K | 4 | 3–6 |
| 4 | 1.512K–2.512K | 4 | 7–10 |

Since each segment line involves 256K addresses, the low order address requires 18 address lines to create 2*18 permutations to address one 256K module. The four high order address bits permit selecting one of 16 segments, resulting in an address bus of 22 lines for addressing the maximum memory capacity.

The segment selector logic comprises a matrix of substantially identical logic cells arranged in four columns of 16 rows. The columns of the matrix correspond to banks, while the rows are associated with segment lines. The function of the cells is to decide if a segment line should be selected, depending on the size signal of the module currently assigned to the bank. If the size signal is 0, the first segment line is not taken by the first cell and the cell effectively transfers segment line 1 to the first cell in column 2 associated with bank 2. If the size input is 1, indicating a 256K module, the first cell selects segment 1 and outputs a Taken signal to cell 1 in column 2 indicating that the line is taken. The Taken signal is effectively propagated through cells in columns 2, 3 and 4. Cell 1 in column 1 further functions to supply to cell 2 in row 2, column 1, a module size signal indicating the amount of storage capacity remaining in the module after segment 1 has been assigned. Since the bank then has no unassigned capacity, a 0 size signal is supplied to cell 2 in the column and then propagated to cells 3 and 4. Segment lines 2,3 and 4 are therefore passed through to column 2.

If instead an initial size signal of 4, indicating a 1 Meg module had been applied to cell 1 in column 1, the size signal supplied to each of the cells 2,3 and 4 in column 1 would have been reduced by 1 by each cell. In addition cell 2,3 and 4 would select segment lines 2,3 and 4 respectively.

The logic in each cell is substantially identical except the cells in the first bank do not require inputs from a previous cell indicating that a segment line has been taken by the previous cell. The various output signals are developed through processing the input signals with combinatorial logic that produces the correct output for various input signals.

It is, therefore, an object of the present invention to provide an improved method and system which permits memory modules having different predetermined address capacities to be employed in the same memory system.

Another object of the present invention is to provide a memory system employing a plurality of memory modules having different address capacities to be automatically configured into a range of contiguous addresses.

A further object of the present invention is to provide in a memory system comprising a plurality of memory modules having different predetermined address capacities which are arranged to define a range of contiguous addresses, the ability to automatically maintain a contiguous address range when one or more of the memory modules is replaced with a module of a different address capacity.

A still further object of the present invention is to provide an improved method for automatically assigning memory modules having different address capacities to contiguous segments of a total memory address range.

Object and advantages other than those mentioned above will become apparent from the following description when read in connection with the drawing.

DESCRIPTION OF THE PREFERRED EMBODIMENT

Figure 1:
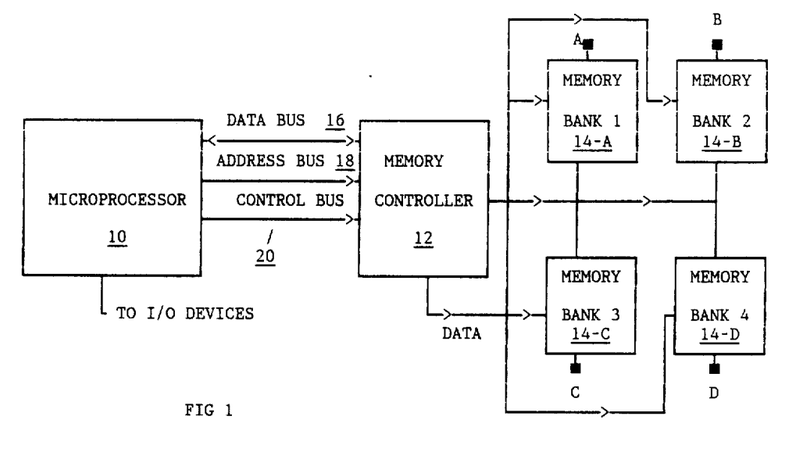
FIG. 1 illustrates the relationship of a microprocessor to the memory system and other I/O devices in the typical data processing system.

FIG. 1 is a functional block diagram of a typical data processing system in which the present invention may be advantageously employed.

As shown, the system comprises a microprocessor 10, a memory controller 12 and 4 memory banks 14A–14D. The memory controller 12 is interconnected to the microprocessor 10 by a data bus 16, an address bus 18 and a control bus 20. As is conventional, other units (not shown) such as a printer, storage and tape file units, and a display may also be connected to bus 16, 18 and 20 or directly to the microprocessor.

Each of the 4 memory banks 14A–14D are identical, and in practice may consist of nine separate sockets mounted on a printed circuit board. Each socket is adapted to receive a memory module that has a predetermined address capacity. The term "address capacity" is used to describe the total number of addressable locations for the module. A memory module referred to in the art as a 64K memory module, has a nominal 64K individual storage location, each of which can store one binary bit. It assumed that the system shown in FIG. 1 transfers and stores data in memory as a nine bit byte comprising eight data bits and one parity bit.

If the system employs 32 data bits, then each memory bank would consist of 32, 64K modules for data and 4, 64K modules for parity bits. The address capacity is still a nominal 64K, but total storage capacity of the memory bank in terms of bytes would be a nominal 256K bytes.

A brief review of the various numerical relationships that will be discussed in connection with the description of the memory addressing arrangement that follows is appropriate. A nominal 64K module actually has 65,136 individual storage locations which are defined by 2*16. Stated differently, it takes 16 binary bits to define 65,136 different 16 bit permutations, each of which corresponds to one address location of a 64K module.

The maximum number of storage locations for a data processing system is determined by the number of address lines in the address bus of the system. A nominal 4 Meg memory system requires 22 address lines.

Figure 2A:
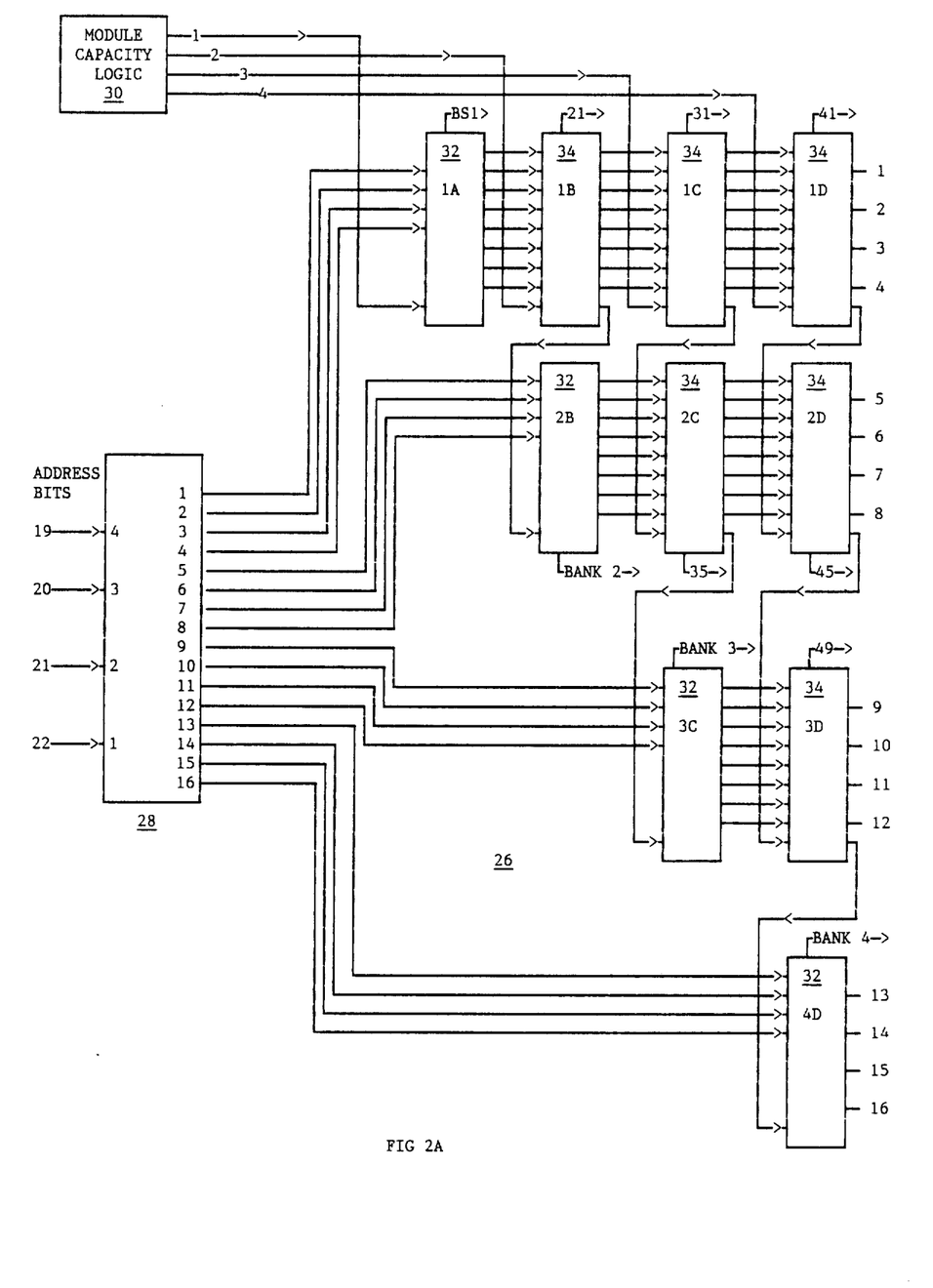
FIGS. 2A and 2B illustrate in block diagram form, the memory bank selector logic of the present invention which is employed advantageously in the memory controller shown in FIG. 1.
Figure 2B:
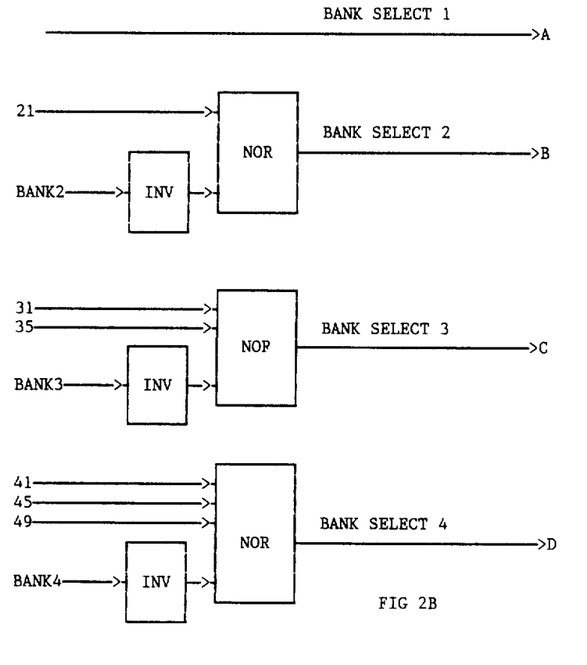

It can be assumed for the purpose of this description that address bus 18 shown in FIG. 2 consists of 24 address lines and, hence, the maximum address capability of the system shown in FIG. 1 is 8 megabytes. However since there are only 4 memory banks and the maximum module size is 1 Meg. only 22 lines are used.

It should also be assumed that each bank 14-A through 14-D is supplied with 20 address lines so that a 1 megabyte memory module is the maximum permissible capacity under these assumptions for each bank. For purposes of illustration, it will also be assumed that the minimum capacity memory module to be employed is a nominal 256K module which requires 18 address lines.

The lower order 20 bits of the $2^4$ bit system address are referred to as the low order address bits of the memory, while bits 22-19 are referred to as the higher order address bits. Bits 19 and 20 serve a dual purpose.

With the above assumption in mind, it will be seen that the system of FIG. 1 can operate with the minimum system address range of 0-256K, or a maximum system address range of 0-4 megabytes. The system will also operate at all modulo 256K capacities inbetween. The specific capacity will depend on the mix of the memory modules in the four banks.

The manner in which the contiguous 256K segments of the system address range are assigned to the banks 14A-14D for the various mix of capacity modules will now be described in connection with FIG. 2.

The segment assignment arrangement 26 shown in FIG. 2 comprises an H by 2*H signal converter or translator 28. In the embodiment shown, a 4×16 translator is depicted in block form without any detail since any prior art convertor that can perform this function may be employed for the block 28.

The selection of the numbers 4 and 16 is based on the number of higher order address bits H, the maximum memory capacity, and the minimum capacity selected for the modules such that the maximum memory capacity is equal to 2*H times the minimum capacity.

Figure 3:
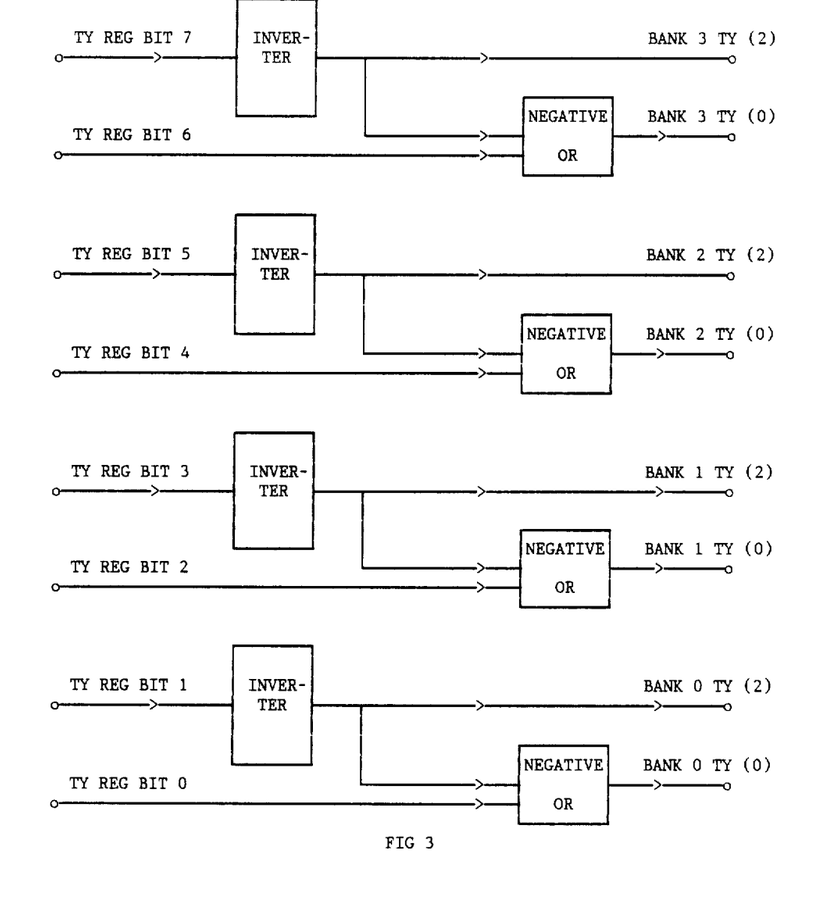
FIG. 3 illustrates in detail the logic of the module capacity logic block shown in FIG. 2A.

The segment assignment arrangement 26 of FIG. 2 further includes the module capacity logic block 30. The function of block 30 is to provide a signal indicative of the capacity of the modules in each memory bank. The details of block 30 are shown in FIG. 3 and will be discussed later. In the preferred embodiment, the memory modules in memory banks 14A-14D are equipped to provide this data automatically in any suitable prior art arrangement.

The segment assignment arrangement 26 of FIG. 2 also includes a plurality of first stage segment line selection logic blocks 32 and a second plurality of second stage segment line selection logic blocks 33. Logic blocks 32 and 33 are substantially identical from a functional standpoint in that they develope Bank selection signals from selected input signals. Their differences will be discussed in connection with FIGS. 4 and 6 which illustrate the detail logic.

Figure 4:
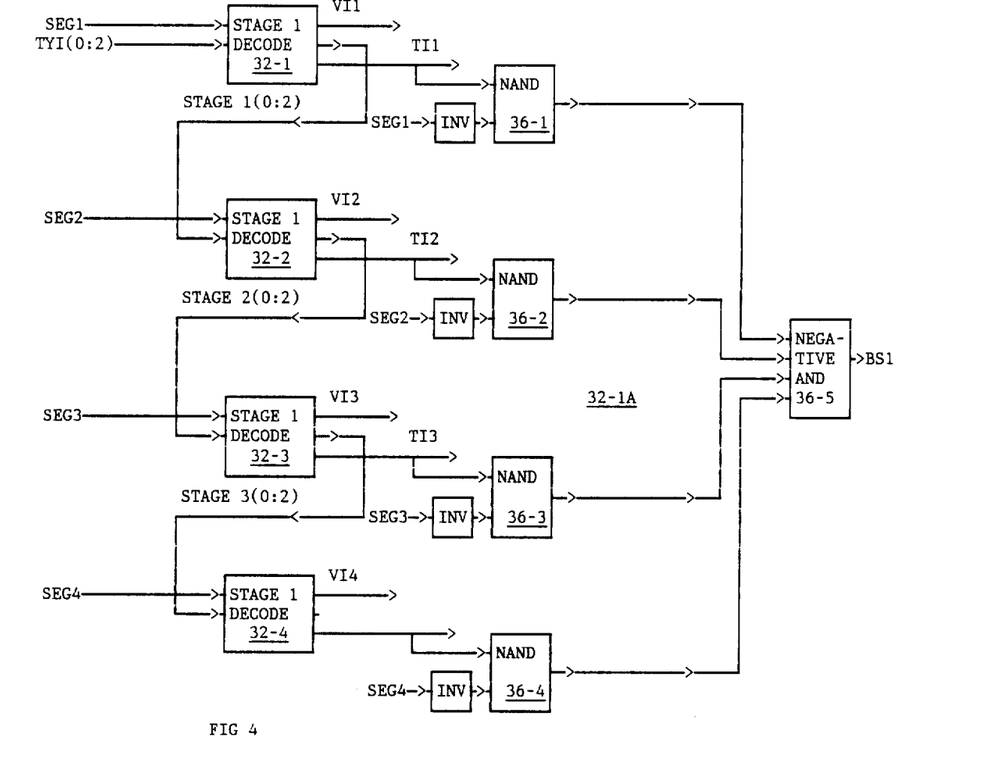
FIG. 4 illustrates in detail the cell relationships of the four cell stage one decoder shown in FIG. 2.

As shown in FIG. 4, stage 1 block consists of four separate decoders cells 32-1 through 32-4. Each cell has two inputs. Cell 32-1 has one input connected to receive segment line 1 of translator 28. Cells 32-2 through 32-4 each have an input connected to receive segment lines 2-4 respectively of translator 28. The other input to cell 32-1 is connected to the output of the module capacity logic 30 of FIG. 2 and receives a 3 bit signal indicating the module capacity for the module in bank one.

In the preferred embodiment, three size signals are developed; a 0 signal indicating that no modules are installed, a 1 signal indicating a 256K module is installed, and a 4 signal indicating that a 1 Meg module is installed.

The function of the cell in column 1, row 1 is to first develop by combinatorial logic, two output signals to indicate if the segment line is selected by this cell or not. The second function is to provide a signal to cell 32-2 in row 2 which in effect indicates if any capacity is left in the module installed in bank 1. If a module is installed in bank 1, the capacity signal is either 1 or 4. The logic, therefore, indicates that segment one is taken and the valid line selects bank one. If a 256K module is installed, the logic supplies a 0 value signal to stage 32-2, indicating that all the address range of bank one has been assigned. If, on the other hand, a 1 Meg module is installed, the logic supplies a 3 size signal to stage 32-2, indicating there are 3 more increments of memory in bank 14A to be assigned. Cell 32-2 selects segment line 2 and passes a value of 2 to cell 32-3. Cell 32-3 selects segment 3 and passes a value of 1 to cell 32-4, which selects the segment 4 line. The Valid lines designated VI1, VI2, VI3 and VI4 are activated if a 1 Meg module is installed. Output line VI1 is active if a 256K module is installed. If the Valid line is active, the Taken line is inactive. If the Valid line is inactive, the Taken line is active, indicating that the segment line is available for the next memory bank.

Figure 5:
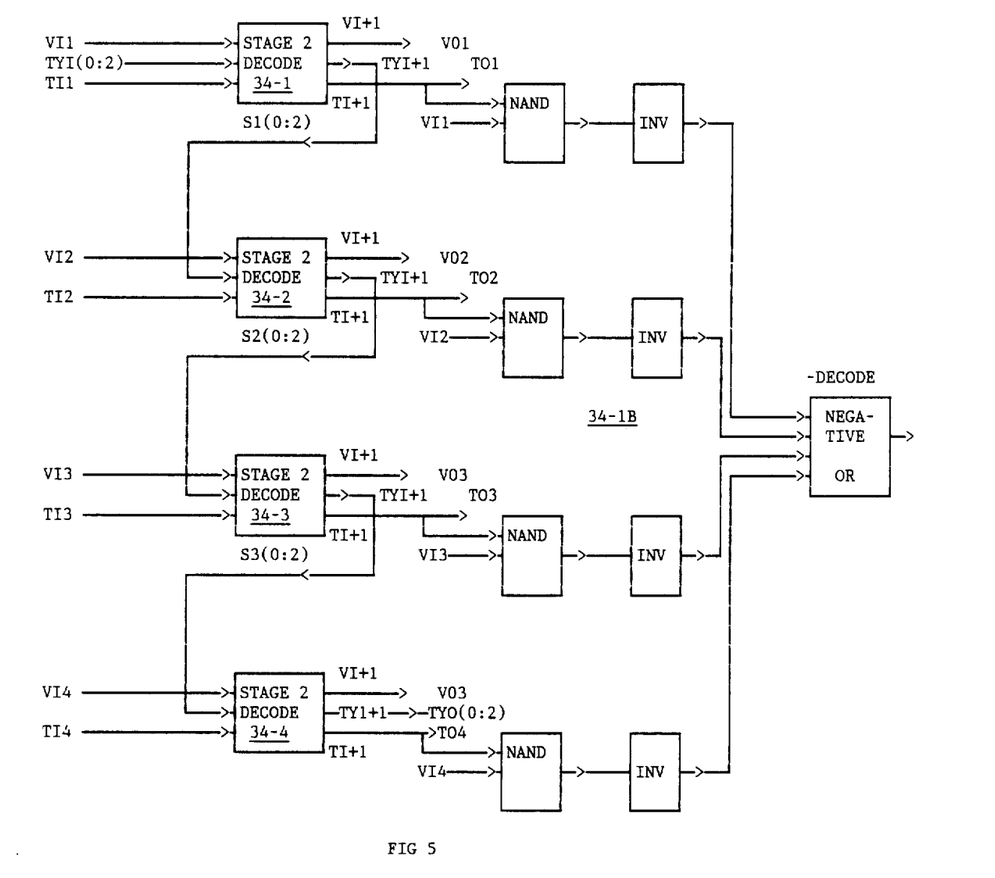
FIG. 5 illustrates in detail the cell relationships of the four cell stage two decoder shown in FIG. 2.

FIG. 5 shows the arrangement of the four cells 34-1 through 34-4 of a stage 2 decoder 34. The function of a stage 2 cell is substantially identical to the stage 1 cell. Cell 34-1 has three inputs, the VI1 and the TI1 signals from cell 32-1 plus the input from the capacity logic 30 of FIG. 2. The output of cell 34-2 is identical to 32-1 in that Valid, Taken, and size signals are developed by the combinatorial logic employing the same basic algorithms of the stage 1 cells.

If segment line 1 was not taken by stage 1, i.e., no modules are installed in bank 14A, then cell 34-1 for bank 14B selects segment line 1 when a 256K module is installed. If a 1 Meg module is installed, then stage 2 cells 34-1 through 34-4 select segment lines 1-4 in the same manner as described in connection with stage 1.

The negative AND gate logic in FIG. 4 consists of negative AND gates 36-1 through 36-5 which develop the bank select signals which are used to select one memory bank for the read and write memory operation at the 20 bit low order address signal supplied to banks 14D—14D.

Figure 6:
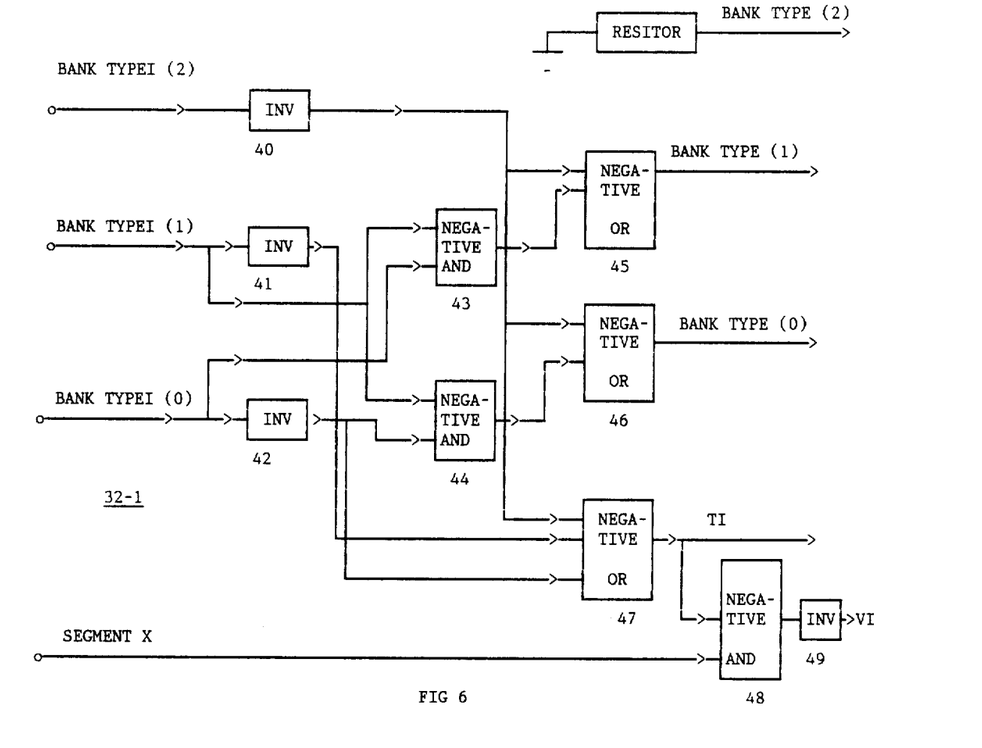
FIG. 6 illustrates one of the combinatorial logic cells of FIG. 4 in detail.

The specific combinatorial logic arrangement for a stage 1 cell such as 32-1 is shown in FIG. 6 and comprises three inverters 40-42, a pair of negative AND gates 43-44. The three negative AND gates 45-47, a negative AND gate 48 and an inverter 49. The truth table for the logic is as follows.

| TRUTH TABLE FOR STAGE 1 CELL | | | | | | | | |
| --- | --- | --- | --- | --- | --- | --- | --- | --- |
| BANK TYPE1 | | | SEGMENT | BANK TYPE2 | | | | |
| (2) | (1) | (0) | LINE # | (2) | (1) | (0) | TI | VI |
| 0 | 0 | 0 | 0 | 0 | 0 | 0 | 0 | 0 |
| 0 | 0 | 0 | 1 | 0 | 0 | 0 | 0 | 1 |
| 0 | 0 | 1 | 0 | 0 | 0 | 0 | 1 | 0 |
| 0 | 0 | 1 | 1 | 0 | 0 | 0 | 1 | 1 |
| 0 | 1 | 0 | 0 | 0 | 0 | 1 | 1 | 0 |
| 0 | 1 | 0 | 1 | 0 | 0 | 1 | 1 | 1 |
| 0 | 1 | 1 | 0 | 0 | 1 | 0 | 1 | 0 |
| 0 | 1 | 1 | 1 | 0 | 1 | 0 | 1 | 1 |
| 1 | 0 | 0 | 0 | 0 | 1 | 1 | 1 | 0 |
| 1 | 0 | 0 | 1 | 0 | 1 | 1 | 1 | 1 |
| X | X | X | X | X | X | X | X | X |
| X | X | X | X | X | X | X | X | X |

The size signals to inverters 40–42 indicating that either a 1 Meg module, a 256K module or no modules respectively are installed, are translated by inverters –42 and NAND gates 43 and 45 and NOR gates 45–46 to a select Type 1 signal or a select Type 0 signal. The output of NOR gate 47 will indicate that the segment line is taken by the cell and the signal to inverter 42 is not active. Negative AND gate 48 and inverter 49 produce the Valid signal, signalling that bank 14A is to be selected.

Figure 7:
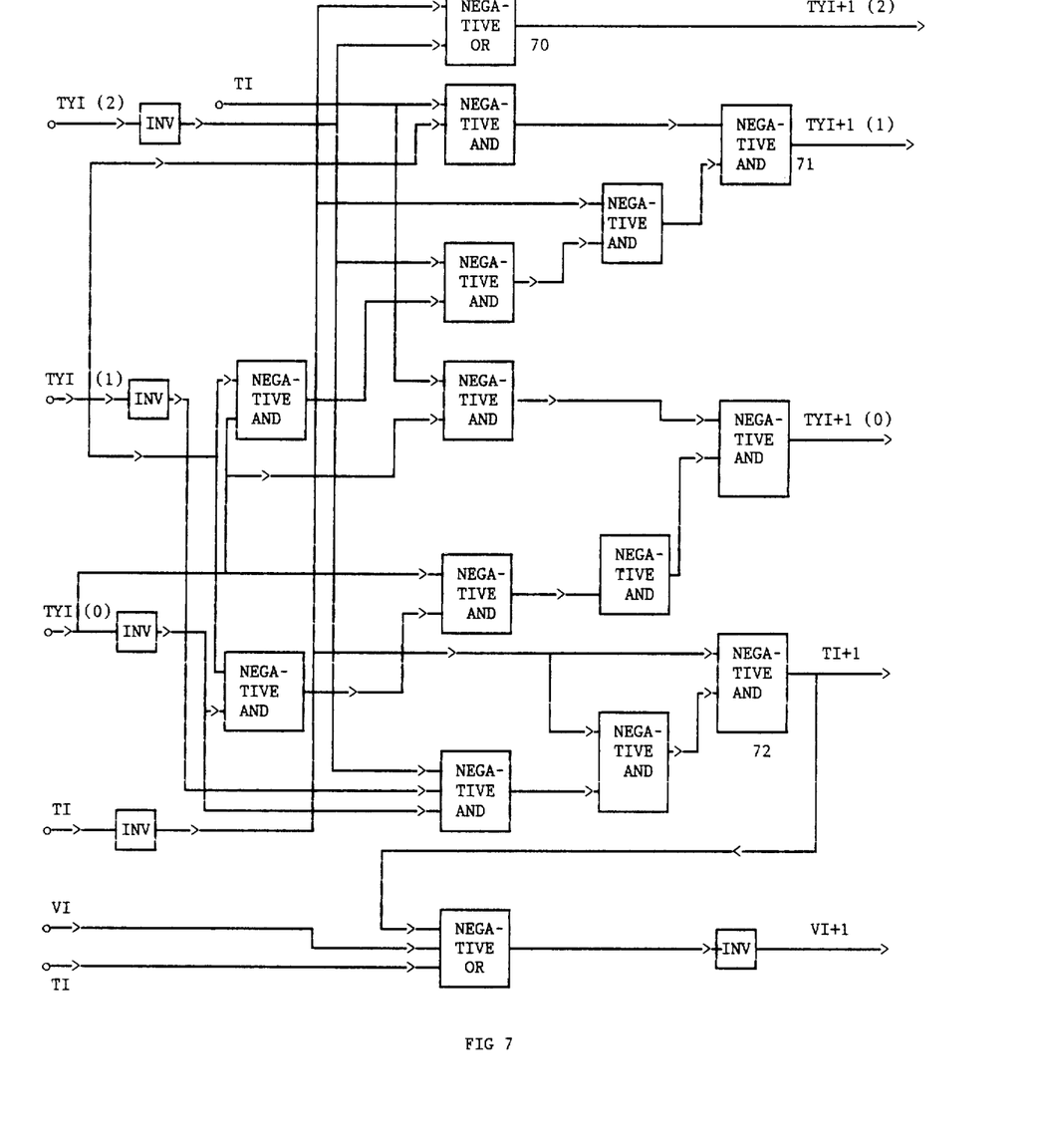
FIG. 7 illustrates one of the stage two cells shown in FIG. 5 in detail.

The combinatorial logic for a stage 2 logic cell 34-1 is shown in FIG. 7. The logic added to the stage 2 cell 34 involves the function of converting the capacity size signals TY1-(2), TY1-(1) and TY1-(0) to signals which indicate to the remaining cells in the bank whether the cell should select its segment line. If the module still has some unassigned address capacity, the output of negative AND gates 70, 71 and 72 forward the capacity information to the following cell in the same column.

The overall operation of the segment line selection arrangement of FIG. 2 should now be apparent.

The segment selection logic blocks 32 or 34, select 1 of the 4 possible segment lines depending on the capacity information supplied specifying the type (i.e., size) of the module installed in the associated memory bank. Under the previous assumptions of 256K and 1 Meg size modules, the blocks will select 1 or 4 of the segment lines. If 1 or 4 lines is selected, the block provides a Bank 1 select signal. If no line is selected, than the bank is empty and the 4 segment lines are effectively passed through to cell block 34 associated with bank 2. If bank 2, 14B in FIG. 1 has a type one module, i.e., 256K installed, then segment line 1 is selected and segment lines 2, 3 and 4 are effectively passed to block 34 in column 3, which is associated with bank 14C. Bank select line 21 causes bank 14B to be selected for the segment 1 line. Assuming bank three has a 1 Meg module, then lines 2, 3 and 4 will be selected by bank 3 and bank select line 3-1 is activated. Since all four segment lines 1-4 have been selected, 1 by block 34-1b and three by a block 34-1c, block 34-1d is never given the opportunity to select any of the segment lines. 1-4.

However, since bank 14C contains a 1 Meg module, it has the capability of supporting one more segment line. That selection is achieved by block 34-2c. The fact that bank 14C still has a 256K segment unassigned was indicated by block 34-1c, transferring the type 1 size signal to block 34-2c which allowed the first cell 32-5 to select segment line 5 since all four segment lines, 5-8, were passed through the logic of block 32-2b. This occurred because bank 14B had used up all of its capacity when signal line 1 was selected by cell 34-1b. Since block 32-2B received a type 0 size signal lines 5-8 were passed through to block 34-2C. A Bank 3 select signal is developed by blocks 34-1C and 34-2C.

Since memory bank 3 has no further capacity, block 34-2c does two things; first, it advises block 32-3c by sending a type 0 size signal so that bank 3 does not select any more lines. Block 23-3c therefore effectively passes segment lines 9-12 to block 34-3d associated with bank 4. Simultaneously, segment lines 6-8 are passed to block 34-2D from block 32-3D. On the assumption that bank 4 has a 1 Meg module, segment lines 6, 7, and 8 are selected by block 34-2d. A Bank 4 select signal is developed by block 34-2d to select segment 6, 7 and 8 by bank 14D.

In addition, a type 1 size signal is developed by the logic of 34-2d since a type 4 size signal was supplied by block 34-1d. Block 34-3d selects segment line 9 and also provides a Bank 4 select signal, indicating that segment line 9 is assigned to bank 4. No further signal lines are selected by block 34-3d or block 32-4d.

By converting the 4 high order bits, 22-19, to 16 separate signal lines, one of four memory banks is selected to perform a memory operation in the modules installed in that bank. The segment assignment logic allows modules of different capacities to be used in any bank and in any combination including leaving the banks empty.

The arrangement prevents many of the human errors from occurring that caused many of the prior art arrangements to be discarded. The upgrading of memory, in that it is a relatively simple process, employing the disclosed arrangement.

In the event dynamic memory modules are employed rather than static memory modules, a slight modification of the system occurs due to the fact that dynamic RAM modules, DRAMS, require extra control lines for supply a Row Address Select (RAS) signal and a Column Address Select (CAS) signal to the module. Also Drams are addressed by multiplexing the row address lines and the column address lines to a set of common pins on the memory bank. If the memory bank is able to support DRAM modules of different capacities, then a different group of address lines must be available for each module type and multiplexed into the bank.

Figure 8:
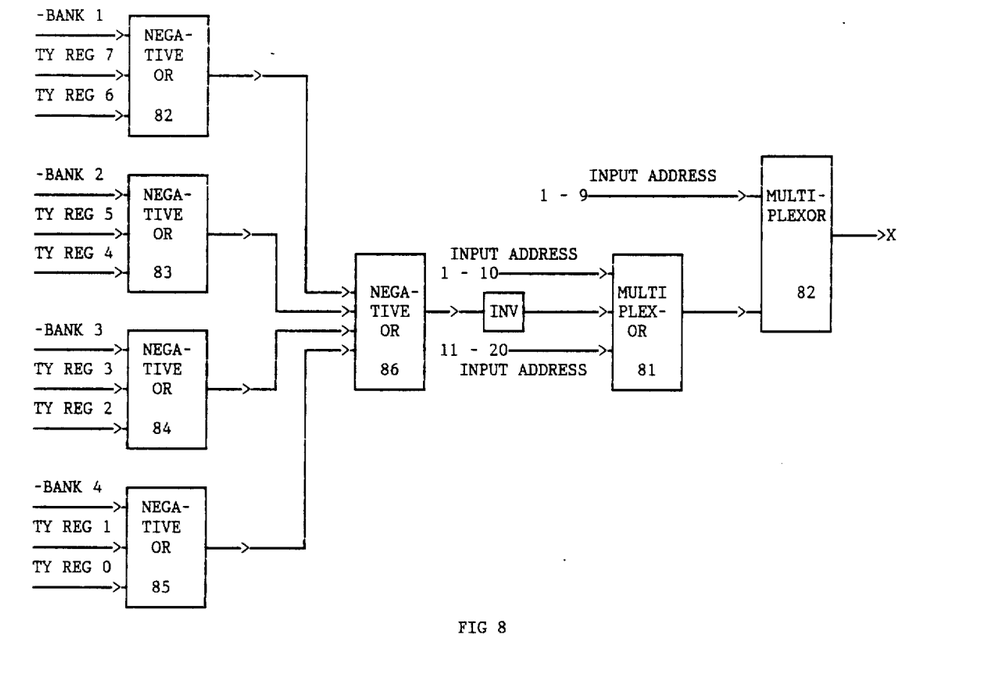
FIG. 8 illustrates a modification of the low order addressing operation to accommodate the use of dynamic RAMS in the memory blocks shown in FIG. 1.

FIG. 8 illustrates a set of logic for controlling a multiplexor 80 on the assumption that the banks can support a 256K DRAM module and a 1 Meg. DRAM module. Since a 256K DRAM module requires 18 address lines, 9 of which are connected to the bank at any one time, lines 1-9 and 10-18 are alternately connected to the bank. Howver a 1 Meg. module requires 20 address lines, 10 of which are connected to the bank at any one time. Thus lines 1-10 and 11-18 are connected alternately to the bank at any one time. Address line 10 is therefore switched between the different groups depending on which Dram module is installed in the bank. The multiplexor 80 and 81 are under the control of the negative or gates 82-86 of FIG. 8. Gate 82-84 receive size signals from each bank in the same manner described in connection with FIG. 1.

Figure 9A:
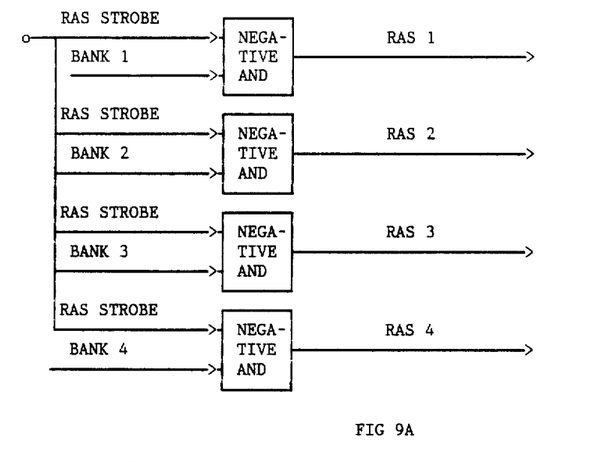
FIGS. 9A and 9B illustrate the logic for developing bank selection/control signals for the dynamic RAMS.
Figure 9B:
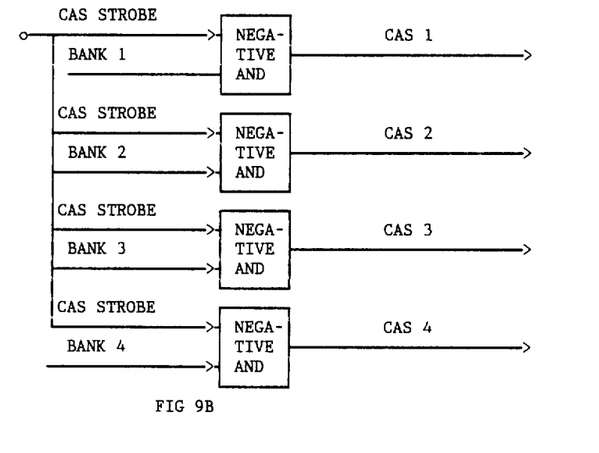
Figure 10:
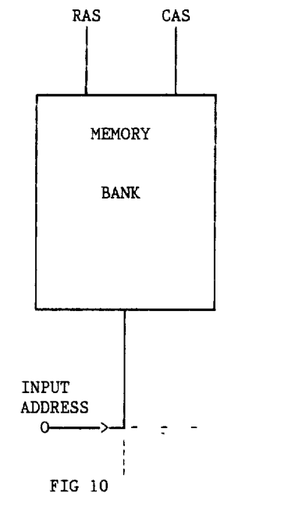
FIG. 10 illustrates 1 dynamic memory module with the RAS and CAS inputs.

FIG. 10 illustrates the RAS and the CAS input terminal of a DRAM module. FIG. 9 illustrates the gating Bank select signals by a RAS and CAS strobe signal to develope the RAS1-RAS4 and CAS1-CAS4 signals. RAS1 and CAS1 lines are connected respectively to the RAS and CAS input terminals of the modules installed in bank 1(14A). the remaining lines are similarly connected to input terminals of the modules in banks 2, 3 and 4.

It should be understood that while a preferred embodiment of the present invention has been described along with a minor modification to accommodate DRAM modules in addition to RAM modules, other modifications made be made without departing from the spirit of the invention and the scope of the following Claims.

We claim:

1. A memory sub-system for an information handling system for automatically creating a linear address range from a plurality of memory arrays installed in a plurality of simultaneously addressable memory banks, regardless of the number and type of said installed arrays, where each different said type of installed array has a different maximum number of addressable storage locations where each said maximum number is an even multiple of the smallest said maximum number, said range comprising a plurality of contiguous segments each of which comprises the same predetermined number of addressable locations, the maximum permissible number of said contiguous segments in said linear address range being a function of the number of said banks and the ratio of address capacities of the arrays having the largest and smallest capacity, said information handling system having a data bus comprising a pre-established number D of data lines and a memory address bus having a total number (H+L) of address lines for addressing said address range, said sub-system comprising, a plurality of said memory banks each of which is addressed simultaneously by a number L of low order memory bus address lines, said number L being determined by the array type having the largest said maximum number of said addressable storage locations of any said array types that are supported by said sub-system, means for developing at each said bank, size signals to indicate the type of array that is installed in said bank, means for generating from selected high order address bus lines a plurality of segment identifying signals corresponding in number to at least said maximum permissible number of said contiguous segments, and logic means including a plurality of interrelated logic cells each of which includes a plurality of logic elements interrelated in a predetermined combinatorial circuit for assigning said addressable locations of the array installed in each said bank to contiguous said segments of said linear range in response to said segment identifying signals supplied to said logic cells and in accordance with said array size signals for said installed arrays.

2. The memory sub-system set forth in claim 1 in which said means for generating further includes a converter having input terminals connected to said selected high order lines of said address bus for converting an input signal on said selected address lines into a number of different output signals corresponding to said number of segments, and output terminals, each of which outputs a different one of said output signals, and means for connecting said output terminals to a different one of said logic cells.

3. The memory sub-system set forth in claim 2 in which said logic means, further includes, means for interconnecting said plurality of cells in a matrix having a plurality of rows corresponding to said plurality of output terminals and a plurality of columns each of which is associated with a different one of said ordered banks, and means for supplying said plurality of output signals to the first said cell in different said rows of said matrix.

4. The memory sub-system set forth in claim 3 in which said plurality of columns of logic cells are ordered in a sequence which corresponds to the sequence in which said banks are ordered.

5. The memory sub-system set forth in claim 4 in which at least two different array types are installed in said ordered banks, with one said array type having an address capacity which is "M" times the address capacity of said other array type, and said first column of said matrix comprises a first group of "M" cells positioned in the first "M" rows of said matrix and said size signals for said first bank are supplied to the first said cell in the first of said "M" rows, and said first "M" output terminals of said converter are connected respectively to said "M" cells in said first group.

6. The memory sub-system set forth in claim 5 in which said first column contains one group of "M" cells and each succeeding column in said matrix contains one more group of "M" cells than the next preceding column, and said remaining groups of "M" output terminals of said converter are connected respectively in sequence to the last said group of "M" cells in each of said remaining columns.

7. The memory sub-system set forth in claim 6 in which said memory modules comprise static RAM type modules, each of which include a plurality of address pins corresponding to said number L where address capacity of the largest capacity module is $2^L$ and in which L said address lines of said address bus are connected to said L address pins.

8. The memory sub-system set forth in claim 6 in which said memory modules comprise dynamic RAM type modules, each of which include a plurality of address pins where the address capacity of the largest capacity module is $2^{2K}$ and in which 2 groups of K address lines of said address bus are connected sequentially to K said address pins to allow 2K address bits of an input address to sequentially address each said bank, and other said bits of said input address from said address bus are processed to develop Row Address Select and Column Address Select select signals for one of said banks.

9. The memory sub-system set forth in claim 8 further including multiplexing means for sequentially connecting first and second groups of said K address lines to said modules.

10. A method for use in a memory sub-system having a plurality of ordered memory banks for automatically assigning a plurality of memory arrays installed in said banks to an address range of an information handling system, said arrays having different address capacities, said range having a maximum permissible number of contiguous address segments determined by the number of said banks and the ratio of address capacities of the arrays having the largest and smallest capacity, each said segment having a plurality of addressable locations corresponding to the number of addressable locations in said array having said smallest capacity, said banks being addressed concurrently during a memory addressing operation by a plurality of low order memory bus address lines sufficient to generate the number of memory addresses corresponding to the number of address locations in the array having the greatest address capacity which is supported by said sub-system, said method comprising the steps of,
  (A) determining said ratio of the address capacities of the array with the largest capacity and the array with the smallest capacity,
  (B) developing at each said bank, a size signal indicating the address capacity of said array installed in said bank,
  (C) converting high order address bus signals to a plurality of sequentially ordered segment identifying signals during a memory addressing operation, the number of which is determined by the number of said banks and said ratio, and
  (D) processing with predetermined combinatorial logic cells, said segment identifying signals in sequential order with said size signals from said plurality of ordered banks during said memory addressing operation to select one of said banks which causes the address location in said array installed in said selected bank to be addressed by said low order memory bus lines regardless of the placement of said arrays relative to said ordered banks.

11. The method set forth in claim 10 in which said memory bus has at least 22 address lines and said address range extends from 0 to 4 Meg. individual addressable storage locations, said sub-system has 4 memory banks which are addressed simultaneously by 20 said address lines so that each said bank can accommodate one of a plurality of different array types, where the array type having the maximum capacity does not exceed 1 Meg. of storage locations and the array type having the minimum storage capacity is not less than 256K storage locations, to thereby provide in said address range a maximum of 16 different contiguous address segments, each of which contains 256K contiguous address locations depending on the number and type of said memory arrays actually installed in said banks, in which said steps of;
  (A) determining includes the further step of determining said integer is equal to 4,
  (B) converting includes the step of converting four memory bus address lines 22-19 into 16 said sequentially ordered segment lines,
  (C) developing includes the further step of developing at least 3 size signals for each of said banks which indicate the size of said arrays installed, if any, in each said bank, and
  (D) processing includes the further steps of first,
    (1) logically processing the size signal from said first bank with said first segment line to develop three separate output signals A, B and C indicating that said first line segment has been assigned to the first bank when signal A is active, that said first line segment is available for assignment to the remaining said banks when signal B is active and the size of any remaining address range that is available in the memory array in said first bank for assignment to the succeeding 3 segment lines when signal C is active, and
    (2) then logically processing said C output signal with said second segment line to develop a C' signal corresponding in function to said C signal, and also logically processing said A and B signals with the size signal from said second bank to develop three separate signals corresponding in function to signals A, B and C,
    (3) and repeating the logical processing steps set forth above for each of said 16 segment lines, whereby said segment lines are assigned to said banks in a sequential fashion to provide a contiguous address range of a size corresponding to the sum of the capacities of said individual arrays regardless of the order said arrays of different capacities are installed in said banks.

* * * * *